United States Patent
Hoffman

(10) Patent No.: US 10,151,141 B2
(45) Date of Patent: Dec. 11, 2018

(54) INSECT KILLING DOOR SYSTEM

(71) Applicant: Erik Hoffman, Elizabeth, CO (US)

(72) Inventor: Erik Hoffman, Elizabeth, CO (US)

(*) Notice: Subject to any disclaimer, the term of this patent is extended or adjusted under 35 U.S.C. 154(b) by 2 days.

(21) Appl. No.: 15/466,084

(22) Filed: Mar. 22, 2017

(65) Prior Publication Data

US 2018/0274294 A1    Sep. 27, 2018

(51) Int. Cl.
| | |
|---|---|
| *E06B 9/52* | (2006.01) |
| *A01M 29/34* | (2011.01) |
| *A01M 1/22* | (2006.01) |
| *A01M 1/24* | (2006.01) |

(52) U.S. Cl.
CPC .......... *E06B 9/52* (2013.01); *A01M 1/223* (2013.01); *A01M 1/24* (2013.01); *A01M 29/34* (2013.01); *E06B 2009/527* (2013.01)

(58) Field of Classification Search
CPC .. A01M 1/223; A01M 1/24; A01M 2200/012; E06B 9/52
See application file for complete search history.

(56) References Cited

U.S. PATENT DOCUMENTS

| | | | |
|---|---|---|---|
| 1,059,253 A | 4/1913 | Wimbush | |
| 1,167,855 A | 1/1916 | Stipp | |
| 1,648,723 A | 11/1927 | Coglon | |
| 1,651,999 A | 12/1927 | Coglon | |
| 1,730,608 A | 10/1929 | Frost | |
| 1,871,978 A * | 8/1932 | Frost | A01M 1/04 43/112 |
| 1,879,495 A * | 9/1932 | Renwick | A01M 1/223 43/112 |
| 2,001,414 A * | 5/1935 | Folmer | A01M 1/02 43/112 |
| 2,030,310 A | 2/1936 | McWilliams | |
| 2,080,242 A * | 5/1937 | Ward | A01M 1/223 43/112 |
| 2,117,767 A * | 5/1938 | Lindsley | A01M 1/223 43/112 |
| 2,218,369 A * | 10/1940 | Whipple | A01M 1/223 174/158 R |
| 3,077,050 A * | 2/1963 | Makara | A01M 1/223 43/112 |
| 3,680,251 A * | 8/1972 | Springer | A01M 1/04 43/112 |
| 4,300,306 A * | 11/1981 | Hudgin | A01M 1/223 174/117 M |
| D432,668 S | 10/2000 | Lilie | |

(Continued)

FOREIGN PATENT DOCUMENTS

WO    WO9944418    9/1999

*Primary Examiner* — Justin B Rephann

(57) ABSTRACT

An insect killing door system includes a door that is hingedly positioned in an entry to a building. The door has a window and an electrification unit is positioned to cover the window. Moreover, the electrification unit inhibits insects from passing through the window. The electrification unit is selectively turned on to kill insects that have landed on the electrification unit. In this way the insects are inhibited from entering the building when the door is opened. A control unit is provided and the control unit is in wireless electrical communication with the electrification unit. The control unit selectively turns the electrification unit on and off.

10 Claims, 6 Drawing Sheets

(56) References Cited

U.S. PATENT DOCUMENTS

| | | | | |
|---|---|---|---|---|
| 6,718,687 B2* | 4/2004 | Robison | ............... | A01M 1/023 43/114 |
| 6,874,273 B1* | 4/2005 | Weisenburg, III | ...... | A01M 1/04 43/112 |
| 8,371,063 B2* | 2/2013 | King | .................... | A01M 1/223 43/112 |
| 2017/0188563 A1* | 7/2017 | Lee | ........................ | A01M 1/04 |

* cited by examiner

INSECT KILLING DOOR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to insect killing devices and more particularly pertains to a new insect killing device for killing insects that have collected on a door prior to opening the door.

BRIEF SUMMARY OF THE INVENTION

An embodiment of the disclosure meets the needs presented above by generally comprising a door that is hingedly positioned in an entry to a building. The door has a window and an electrification unit is positioned to cover the window. Moreover, the electrification unit inhibits insects from passing through the window. The electrification unit is selectively turned on to kill insects that have landed on the electrification unit. In this way the insects are inhibited from entering the building when the door is opened. A control unit is provided and the control unit is in wireless electrical communication with the electrification unit. The control unit selectively turns the electrification unit on and off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
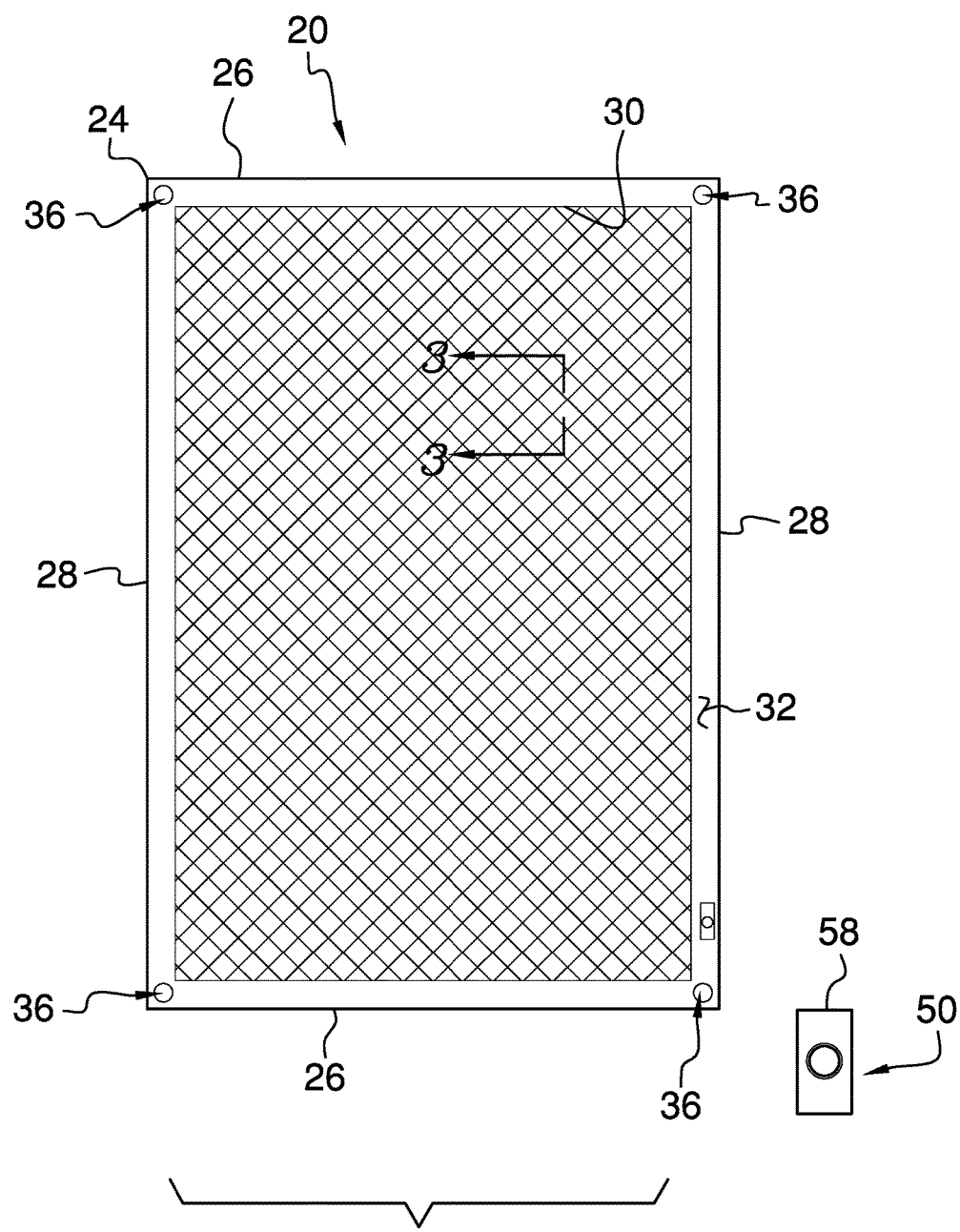
FIG. 1 is a front view of an electrification unit and a control unit of an insect killing door system according to an embodiment of the disclosure.
Figure 2:
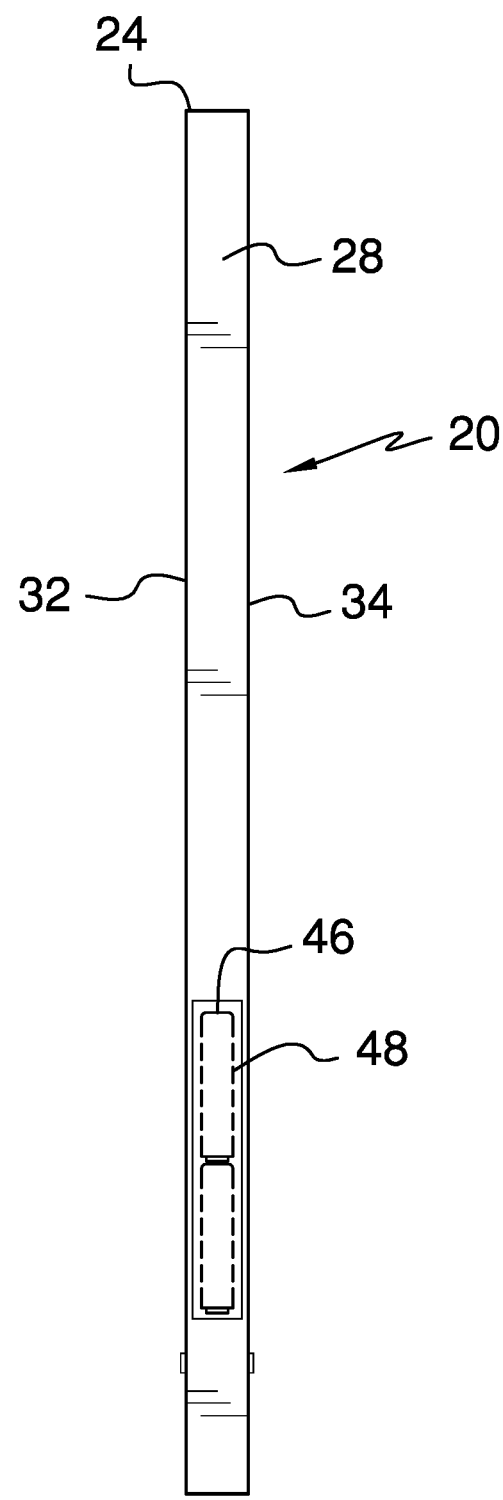
FIG. 2 is a right side phantom view of an electrification unit of an embodiment of the disclosure.
Figure 3:
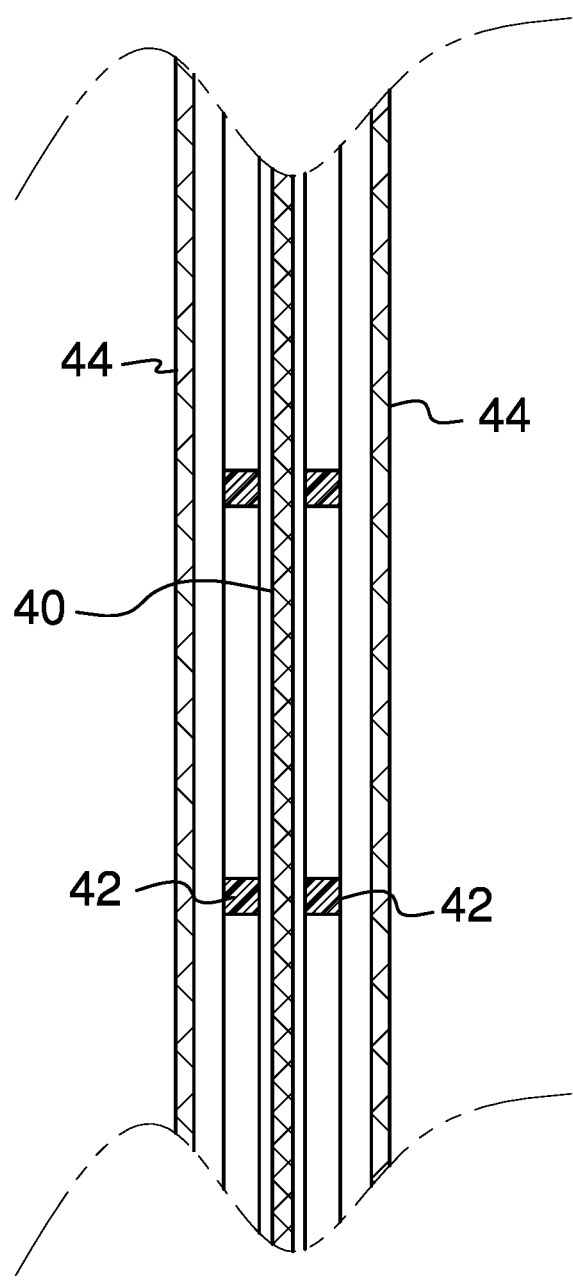
FIG. 3 is a cross sectional view taken along line 3-3 of FIG. 1 of an embodiment of the disclosure.
Figure 4:
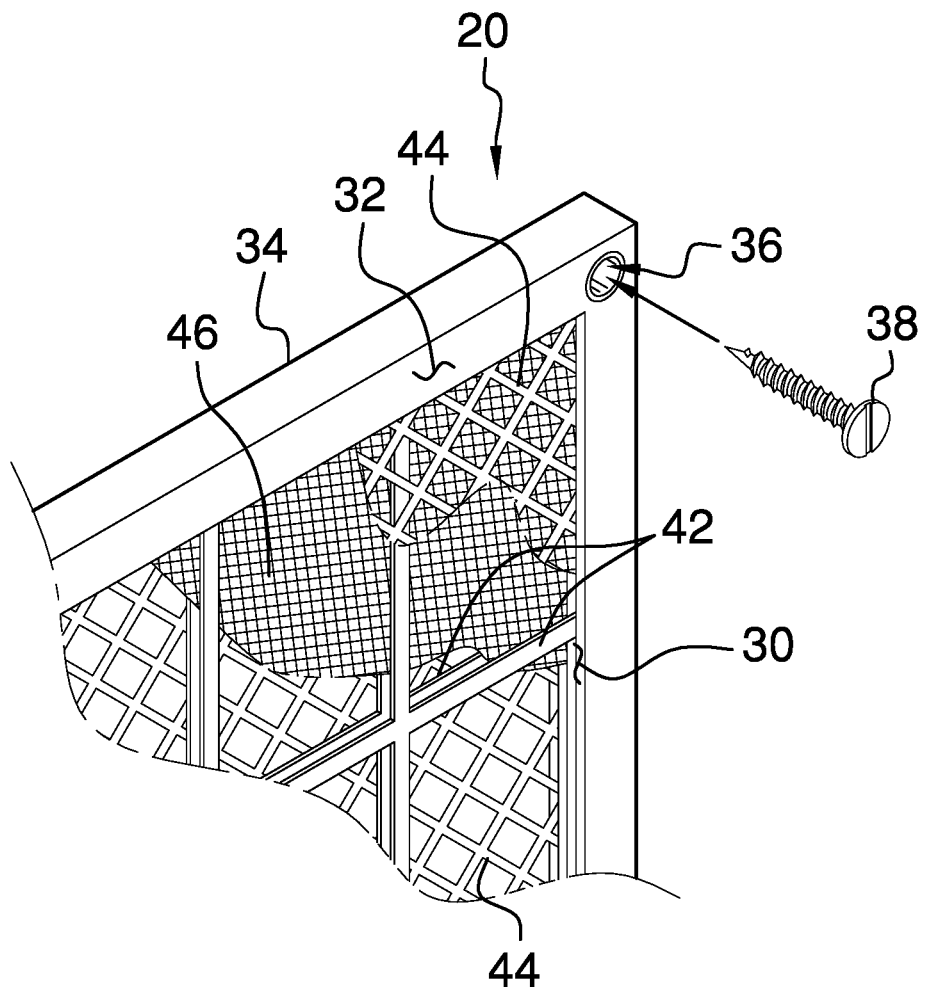
FIG. 4 is a perspective cut-away view of an electrification unit of an embodiment of the disclosure.
Figure 5:
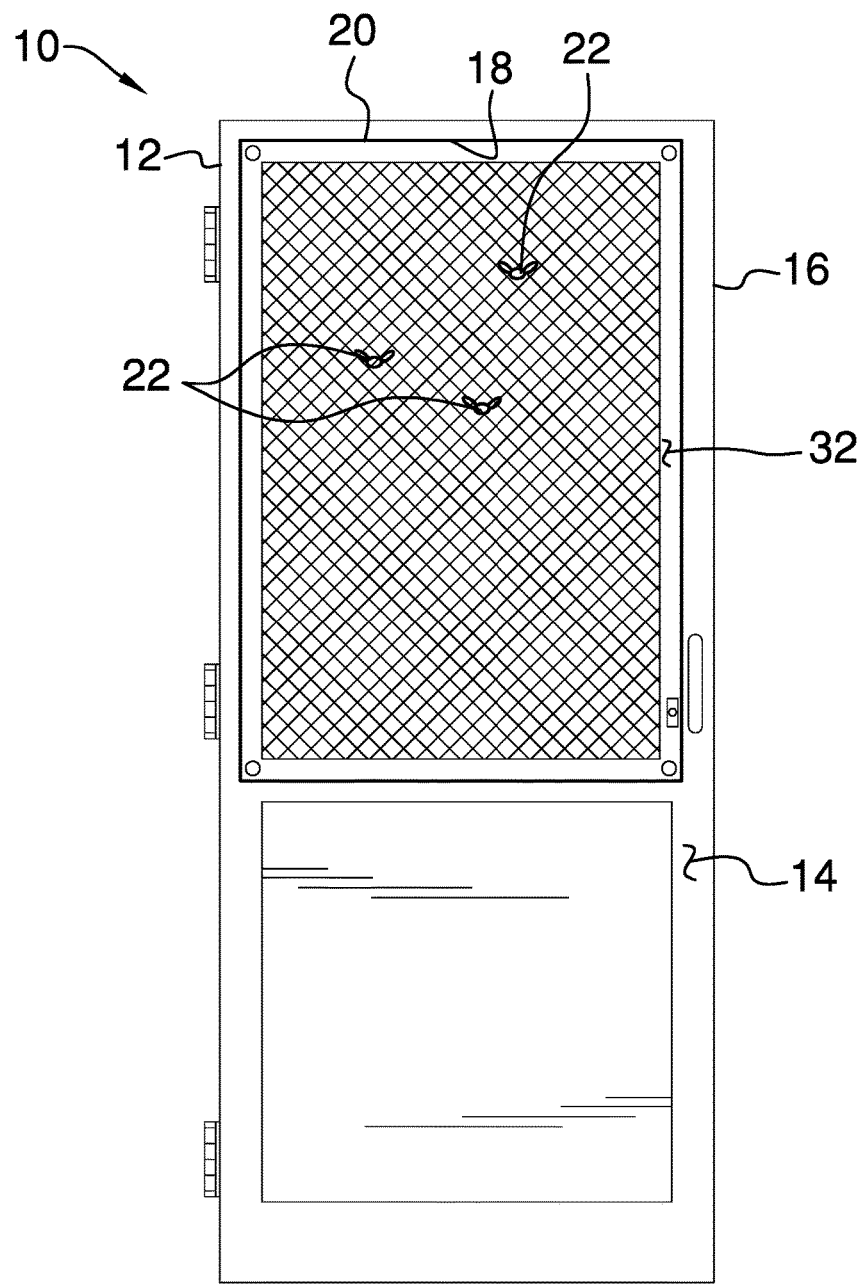
FIG. 5 is a perspective view of an embodiment of the disclosure.
Figure 6:
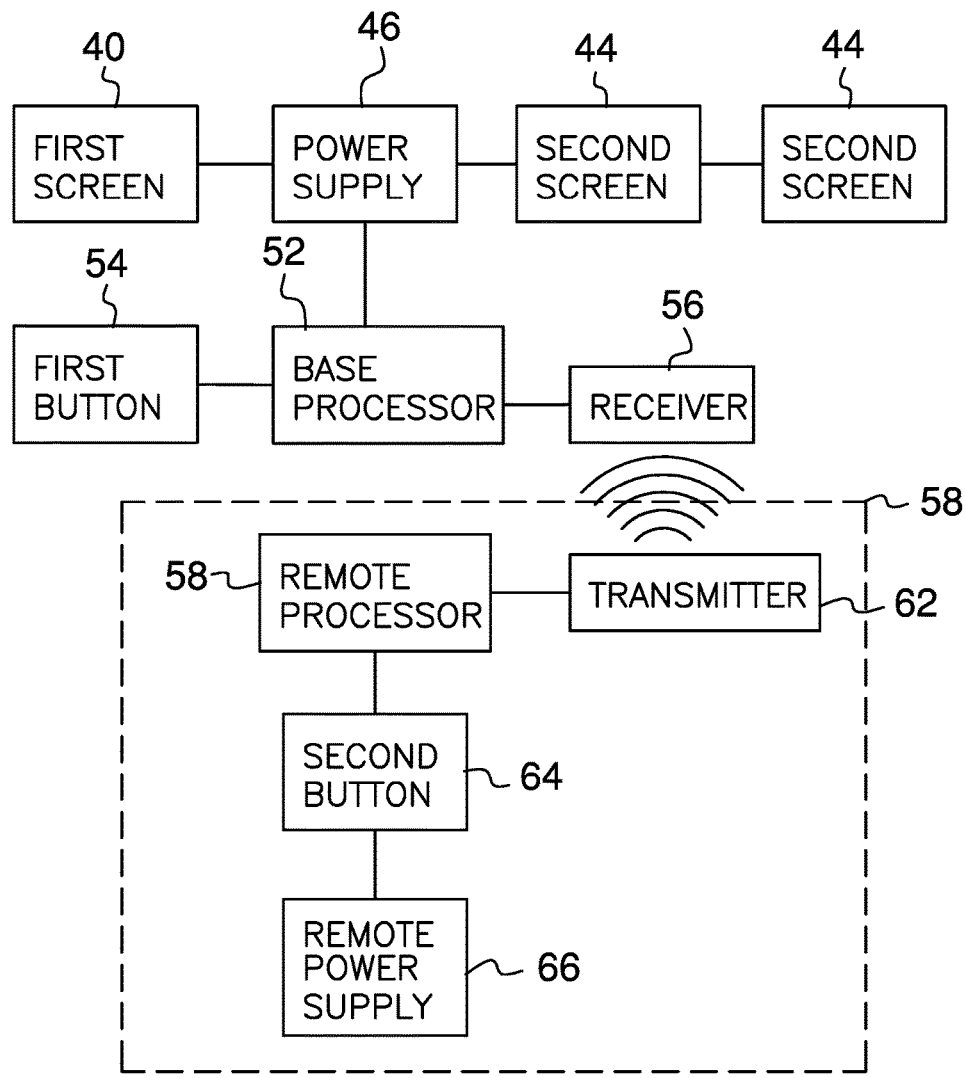
FIG. 6 is a schematic view of an embodiment of the disclosure.

With reference now to the drawings, and in particular to FIGS. 1 through 6 thereof, a new insect killing device embodying the principles and concepts of an embodiment of the disclosure and generally designated by the reference numeral 10 will be described.

As best illustrated in FIGS. 1 through 6, the insect killing door system 10 generally comprises a door 12 that is hingedly positioned in an entry to a building. The door 12 has a first surface 14 and a second surface 16 and a window 18 extends through the first surface 14 and the second surface 16. The door 12 may be a screen door, a storm door or any other conventional type of exterior door. Additionally, the door 12 is mounted such that the first surface 14 faces outside.

An electrification unit 20 is coupled to the door 12 and the electrification unit 20 is positioned over the window 18. The electrification unit 20 inhibits insects 22 from passing through the window 18. Moreover, the electrification unit 20 is selectively turned on to kill insects 22 that have landed on the electrification unit 20. In this way the insects 22 are inhibited from entering the building when the door 12 is opened.

The electrification unit 20 comprises a frame 24 that has a pair of first members 26 extending between a pair of second members 28. The first members 26 are spaced apart from each other such that the frame 24 forms a rectangle. The frame 24 has an inwardly facing surface 30, a front surface 32 and a back surface 34. The frame 24 is positioned to cover the window 18 having the back surface 34 of the frame 24 abutting the first surface 14 of the door 12. In this way the frame 24 is positioned outside when the door 12 is closed such that the frame 24 is accessible to the insects 22.

A plurality of apertures 36 extends through the frame 24 and each of the apertures 36 is aligned with an associated one of four corners of the frame 24. A plurality of fasteners 38 is provided and each of the fasteners 38 extends through an associated one of the apertures 36 and engages the door 12. In this way the frame 24 is removably coupled to the door 12. The plurality of fasteners 38 may comprise screws or the like.

A first screen 40 is provided and the first screen 40 is positioned within the frame 24. The first screen 40 is coextensive with the inwardly facing surface 30 and the first screen 40 is centrally positioned between the front surface 32 and the back surface 34. Moreover, the first screen 40 is comprised of an electrically conductive material such as steel or the like. The first screen 40 may comprise 0.125 inch mesh such that the first screen 40 inhibits the insects 22 from passing through.

A pair of grids 42 is provided and each of the grids 42 is positioned within the frame 24. Each of the grids 42 is coextensive with the inwardly facing surface 30. Moreover, each of the grids 42 is positioned between the first screen 40 and an associated one of the front surface 32 and the back surface 34. Each of the grids 42 is comprised of an electrically insulating material such as plastic or the like.

A pair of second screens 44 is provided and each of the second screens 44 is positioned within the frame 24. Each of the second screens 44 is coextensive with the inwardly facing surface 30. Each of the second screens 44 is comprised of an electrically conductive material. Moreover, each of the second screens 44 is positioned between an associated one of the grids 42 and an associated one of the front surface 32 and the back surface 34. In this way each of the grids 42 electrically insulates the associated second screen 44 from the first screen 40.

Each of the second screens 44 may comprise 0.25 inch mesh or the like. Furthermore, each of the second screens 44 is large enough to allow the insects 22 to pass through to the first screen 40. Each of the second screens 44 may be spaced from the first screen 40 a distance ranging between 1.0 mm and 3 mm. In this way the insects 22 are inhibited from walking between the first 40 and second 44 screens. The insects 22 complete a circuit between the first screen 40 and the second screens 44 when the insects 22 contact both of the first 40 and second 44 screens.

A power supply 46 is provided and the power supply 46 is coupled to the frame 24. The power supply 46 is electrically coupled to each of the second screens 44 and the first screen 40. The power supply 46 comprises at least one battery 48.

A control unit 50 is provided and the control unit 50 is selectively manipulated. The control unit 50 is in wireless electrical communication with the electrification unit 20 and the control unit 50 selectively turns the electrification unit 20 on and off. The control unit 50 comprises a base processor 52 that is coupled to the frame 24. The base processor 52 is electrically coupled to the power supply 46 to turn the power supply 46 on and off. The base processor 52 may be an electronic processor or the like.

A first button 54 is coupled to the frame 24 and the first button 54 is selectively manipulated. The first button 54 is electrically coupled to the base processor 52 to turn the base processor 52 on and off. The base processor 52 turns the power supply 46 on when the first button 54 is manipulated. In this way each of the first 40 and second 44 screens 44 electrocutes the insects 22. The first button 54 may extend through each of the front surface 32 and the back surface 34 of the frame 24. A receiver 56 is provided and the receiver 56 is coupled to the frame 24. The receiver 56 is electrically coupled to the base processor 52 and the receiver 56 may be a radio frequency receiver 56 or the like.

A remote control 58 is provided and the remote control 58 is selectively be manipulated. A remote processor 60 is positioned within the remote control 58 and the remote processor 60 selectively generates a shock sequence. The remote processor 60 may be an electronic processor or the like. A transmitter 62 is positioned within the remote control 58 and the transmitter 62 is electrically coupled to the remote processor 60. The transmitter 62 is in wireless electrical communication with the receiver 56 to communicate the shock sequence to the receiver 56. Moreover, the base processor 52 turns the power supply 46 on when the remote processor 60 generates the shock sequence. In this way the insects 22 on the second screens 44 are remotely electrocuted.

A second button 64, which may alternatively be referenced as a remote button, is coupled to the remote control 58 and the second button 64 is selectively manipulated. The second button 64 is electrically coupled to the remote processor 60 and the remote processor 60 generates the shock sequence when the second button 64 is manipulated. The second button 64 may be a spring loaded button that is biased into an off position. A remote power supply 66 is positioned within the remote control 58 and the remote power supply 66 is electrically coupled to the remote processor 60. The remote power supply 66 comprises at least one battery 68.

In use, the frame 24 is coupled to the door 12 such that the frame 24 surrounds the window 18. The first button 54 is selectively manipulated prior to opening the door 12 such that the base processor 52 turns the power supply 46 on. In this way the insects 22 that have landed on the electrification unit 20 are electrified and inhibited from entering the building when the door 12 is opened. Additionally, the second button 64 on the remote control 58 is selectively manipulated prior to opening the door 12. In this way the electrification unit 20 is remotely actuated to electrocute the insects 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An insect killing door system comprising:
a door being configured to be hingedly positioned in an entry to a building, said door having a window, said door having a first surface and a second surface, said window extending through said first surface and said second surface;
an electrification unit being coupled to said door, said electrification unit being positioned to cover said window wherein said electrification unit is configured to inhibit insects from passing through said window, said electrification unit being selectively turned on wherein said electrification unit is configured to kill insects that have landed on said electrification unit thereby inhibiting the insects from entering the building when said door is opened, said electrification unit including
  a frame having a pair of first members extending between a pair of second members, said first members being spaced apart from each other such that said frame forms a rectangle, said frame having an inwardly facing surface,
  a front surface, and
  a back surface, said frame being positioned over said window having said back surface abutting said door;
  a control unit being configured to be manipulated, said control unit being in wireless electrical communication with said electrification unit, said control unit selectively turning said electrification unit on and off;
  a first screen being positioned within said frame, said first screen being coextensive with said inwardly facing surface, said first screen being centrally positioned between said front surface and said back surface, said first screen being comprised of an electrically conductive material;
  a pair of grids, each of said grids being positioned within said frame, each of said grids being coextensive with said inwardly facing surface, each of said grids being positioned between said first screen and an associated one of said front surface and said back surface, each of said grids being comprised of an electrically insulating material; and
  a pair of second screens, each of said second screens being positioned within said frame, each of said second screens being coextensive with said inwardly facing surface, each of said second screens being comprised of an electrically conductive material, each of said screens being positioned between an associated one of said grids and an associated one of said front surface and said back surface such that each of said grids electrically insulates said associated second screen from said first screen, each of said second screens being configured to have the insects land thereon thereby facilitating the insects to complete a circuit between said second screens and said first screen.

2. The assembly according to claim 1, further comprising a power supply being coupled to said frame, said power supply being electrically coupled to each of said second screens and said first screen, said power supply comprising at least one battery.

3. The assembly according to claim 1, wherein:
said electrification unit include a power supply; and
said control unit comprises a base processor being coupled to said frame, said base processor being electrically coupled to said power supply such that said base processor turns said power supply on and off.

4. The assembly according to claim 3, further comprising a first button being coupled to said frame wherein said first button is configured to be manipulated, said first button being electrically coupled to said base processor such that said first button turns said base processor on and off, said base processor turning said power supply on when said first button is manipulated wherein each of said first and second screens is configured to electrocute the insects.

5. The assembly according to claim 3, further comprising a receiver being coupled to said frame, said receiver being electrically coupled to said base processor.

6. The assembly according to claim 1, further comprising:
a remote control being configured to be manipulated;
a remote processor being positioned within said remote control, said remote processor selectively generating a shock sequence.

7. The assembly according to claim 6, further comprising a transmitter being positioned within said remote control, said transmitter being electrically coupled to said remote processor, said transmitter being in wireless electrical communication with said receiver such that said transmitter communicates said shock sequence to said receiver, said base processor turning said power supply on when said remote processor generates said shock sequence.

8. The assembly according to claim 6, further comprising a remote button being coupled to said remote control wherein said remote button is configured to be manipulated, said remote button being electrically coupled to said remote processor, said remote processor generating said shock sequence when said remote button is manipulated.

9. The assembly according to claim 6, further comprising a remote power supply being positioned within said remote control, said remote power supply being electrically coupled to said remote processor, said remote power supply comprising at least one battery.

10. An insect killing door system comprising:
  a door being configured to be hingedly positioned in an entry to a building, said door having a first surface and a second surface, said door having a window extending through said first surface and said second surface;
  an electrification unit being coupled to said door, said electrification unit being positioned over said window wherein said electrification unit is configured to inhibit insects from passing through said window, said electrification unit being selectively turned on wherein said electrification unit is configured to kill insects that have landed on said electrification unit thereby inhibiting the insects from entering the building when said door is opened, said electrification unit comprising:
    a frame having a pair of first members extending between a pair of second members, said first members being spaced apart from each other such that said frame forms a rectangle, said frame having an inwardly facing surface, a front surface and a back surface, said frame being positioned over said window having said back surface abutting said door,
    a first screen being positioned within said frame, said first screen being coextensive with said inwardly facing surface, said first screen being centrally positioned between said front surface and said back surface, said first screen being comprised of an electrically conductive material,
    a pair of grids, each of said grids being positioned within said frame, each of said grids being coextensive with said inwardly facing surface, each of said grids being positioned between said first screen and an associated one of said front surface and said back surface, each of said grids being comprised of an electrically insulating material,
    a pair of second screens, each of said second screens being positioned within said frame, each of said second screens being coextensive with said inwardly facing surface, each of said second screens being comprised of an electrically conductive material, each of said screens being positioned between an associated one of said grids and an associated one of said front surface and said back surface such that each of said grids electrically insulates said associated second screen from said first screen, each of said second screens being configured to have the insects land thereon thereby facilitating the insects to complete a circuit between said second screens and said first screen; and a power supply being coupled to said frame, said power supply being electrically coupled to each of said second screens and said first screen, said power supply comprising at least one battery; and a control unit being configured to be manipulated, said control unit being in wireless electrical communication with said electrification unit, said control unit selectively turning said electrification unit on and off, said control unit comprising:

- a base processor being coupled to said frame, said base processor being electrically coupled to said power supply such that said base processor turns said power supply on and off,
- a first button being coupled to said frame wherein said first button is configured to be manipulated, said first button being electrically coupled to said base processor such that said first button turns said base processor on and off, said base processor turning said power supply on when said first button is manipulated wherein each of said first and second screens is configured to electrocute the insects,
- a receiver being coupled to said frame, said receiver being electrically coupled to said base processor,
- a remote control being configured to be manipulated,
- a remote processor being positioned within said remote control, said remote processor selectively generating an shock sequence,
- a transmitter being positioned within said remote control, said transmitter being electrically coupled to said remote processor, said transmitter being in wireless electrical communication with said receiver such that said transmitter communicates said shock sequence to said receiver, said base processor turning said power supply on when said remote processor generates said shock sequence,
- a second button being coupled to said remote control wherein said second button is configured to be manipulated, said second button being electrically coupled to said remote processor, said remote processor generating said shock sequence when said second button is manipulated, and
- a remote power supply being positioned within said remote control, said remote power supply being electrically coupled to said remote processor, said remote power supply comprising at least one battery.

* * * * *